(12) United States Patent
Andrieux

(10) Patent No.: US 7,498,777 B2
(45) Date of Patent: Mar. 3, 2009

(54) ELECTRICITY PRODUCTION CIRCUIT

(75) Inventor: Christian Andrieux, Angouleme (FR)

(73) Assignee: Moteurs Leroy-Somer, Angouleme (FR)

( * ) Notice: Subject to any disclaimer, the term of this patent is extended or adjusted under 35 U.S.C. 154(b) by 99 days.

(21) Appl. No.: 11/603,077

(22) Filed: Nov. 22, 2006

(65) Prior Publication Data
US 2007/0114977 A1 May 24, 2007

(30) Foreign Application Priority Data
Nov. 23, 2005 (FR) .................................. 05 53573

(51) Int. Cl.
H02P 9/00 (2006.01)
(52) U.S. Cl. ............................... 322/45; 322/37; 322/28
(58) Field of Classification Search ............... 290/7, 290/8; 322/22, 23, 24, 25, 28, 37, 89, 45
See application file for complete search history.

(56) References Cited
U.S. PATENT DOCUMENTS
3,621,368 A * 11/1971 Jules ........................... 322/18
4,024,456 A 5/1977 Sato et al.
4,197,492 A 4/1980 Sato et al.
6,111,390 A * 8/2000 Inaba et al. .................... 322/28
7,183,668 B2 * 2/2007 Ogawa et al. ................. 307/43
7,327,123 B2 * 2/2008 Faberman et al. ............. 322/37

FOREIGN PATENT DOCUMENTS
DE 2 118 703 11/1971
DE 34 32 127 A1 3/1985
DE 199 31 010 A1 11/2000

* cited by examiner

Primary Examiner—Nicholas Ponomarenko
(74) Attorney, Agent, or Firm—Oliff & Berridge, PLC

(57) ABSTRACT

The present invention relates to a circuit for producing electricity, the circuit comprising:
  a first rectifier comprising inputs and an output;
  a second rectifier comprising inputs and an output, the inputs of the first and second rectifiers being for connection to an alternator so that phases of the alternator are connected in series with the inputs of the first and second rectifiers;
  at least one switch for short-circuiting the output of the second rectifier or at least a part of the inputs of the second rectifier; and
  a control unit for controlling the switching of the at least one switch so as to regulate the rectified voltage delivered by the circuit.

30 Claims, 5 Drawing Sheets

ELECTRICITY PRODUCTION CIRCUIT

FIELD OF THE INVENTION

The present invention relates to producing electricity.

BACKGROUND

It is known to produce electricity from an on-board assembly comprising an engine and a circuit for producing electricity from an alternator driven by the engine.

For example, a refrigeration system for a truck or an air-conditioning system for a bus, may be powered by an electricity production circuit having an alternator that is driven by the diesel engine that propels the truck or the bus.

In such a refrigeration or air-conditioning system, the speed of the alternator varies over a relatively large range as a function of the engine speed, e.g. with a factor of 1:5, and this is accompanied by variation in the voltage delivered by the alternator.

SUMMARY

There exists a need to reduce the amplitude of the range over which the voltage varies, e.g. in order to make it easier to power the refrigeration or air-conditioning system and to reduce the cost of the circuit for producing electricity.

According to one aspect of exemplary embodiment of the invention an electricity production circuit is provided, comprising:

a first rectifier having inputs and an output;
a second rectifier having inputs and an output, the inputs of the first and second rectifiers being for connection to an alternator so that phases of the alternator are connected in series between the inputs of the first and second rectifiers;
at least one switch for short-circuiting the output of the second rectifier or at least a part of the inputs of the second rectifier; and
a control unit for controlling the switching of the at least one switch so as to regulate the rectified voltage delivered by the circuit.

The regulation may be carried out as a function of the speed of rotation of the alternator.

In exemplary embodiments of the invention, the two rectifiers comprise outputs that are connected in parallel.

In exemplary embodiments of the invention, the at least one switch is configured to short-circuit the output of the second rectifier, the inputs of the second rectifier being connected to the alternator.

In other exemplary embodiments of the invention, the at least one switch is arranged to short-circuit inputs of the second rectifier.

The control unit may act on the rectified voltage delivered by the electricity production circuit so as to reduce an amplitude of the range of voltage over which the voltage varies. The voltage regulation may be relatively rough or sharp, where appropriate.

The circuit may include the alternator generating alternating current.

When the circuit comprises the alternator, the first and second rectifiers may be delivered to a user already connected to the alternator.

The at least one switch may comprise one or a plurality of electronic components.

The switch(es) may be made by any appropriate means, for example using any electromechanical or semiconductor switch(es), e.g. contactor(s), relay(s), thyristor(s), triac(s), insulated gate bipolar transistor(s) (IGBT) or bipolar transistor(s).

The electricity production circuit may power a motor making use of the electricity produced by the alternator, for example a motor for a compressor or a fan.

This motor may be directly connected to the output of at least one of the rectifiers, without an intermediate battery.

The invention may enable to power relatively easily the motor(s) and/or other devices making use of the electricity produced by the alternator.

The invention enables for instance to deliver a rectified voltage, with an amplitude of the range over which the voltage varies less than without the electricity production circuit, the amplitude of the range over which the voltage varies, lying for instance between 300 V and 510 V when the speed of rotation of the alternator varies between 1000 tr/min and 3500 tr/min.

The control unit may be arranged so as to regulate the rectified voltage around a reference value, the reference value being for instance set by a user or a program.

In an embodiment of the invention, the circuit comprises one electronic switch per phase of the alternator, each switch being connected in series between a neutral point and an input of the second rectifier.

The electronic switches may comprise triacs or any other bidirectional switches that can be controlled. The electronic switches may be controlled so as to short-circuit two of the inputs of the second rectifier in cyclical way.

The control unit may be arranged to control the triggering angle of the electronic switches as a function of the electrical angle of one of the voltages across the terminals of a phase of the alternator.

The control unit may comprise a phase-locked loop.

The invention also provides an electricity production circuit comprising:

a rectifier system for delivering a rectified voltage from an alternator having a plurality of phases; and
a switching system arranged:
in a first state, to enable the rectifier system to rectify voltages across the terminals of the phases of the alternator; and
in a second state, to enable the rectifier system to rectify voltages between phases.

In the first state of the switching system, the voltage delivered by the electricity production circuit may have an amplitude that is substantially equal to the peak voltage of each phase of the alternator, for example, while in the second state, the rectified voltage may have an amplitude that is substantially equal to the peak voltage between the phases of the alternator, for example.

By way of example, the ratio between these rectified voltages is $\sqrt{3}$ for a three-phase alternator.

The switch system may be arranged in such a manner as to change state automatically as a function of the drive speed of the alternator.

By way of example, the switch system may include a control unit arranged to compare information representative of the drive speed of the alternator with at least one reference value, in order to change state as a function of the result of the comparison, where appropriate.

By way of example, the switch system may include a control unit arranged to compare information representative of the drive speed of the alternator at least with a low threshold and a with high threshold in order to create hysteresis.

The switch system may also be arranged so as to change state automatically as a function of the rectified voltage.

By way of example, the switch system may include a control unit arranged to compare information representative of the rectified voltage with at least one reference value in order to change state as a function of the results of the comparison, where appropriate.

By way of example, the switch system may include a control unit arranged to compare information representative of the rectified voltage at least with a low threshold and with a high threshold, in order to create hysteresis.

In exemplary embodiments of the invention, the rectifier system comprises a first rectifier and a second rectifier, each having as many inputs as the alternator has phases, each of the phases being connected or for connection in series with a corresponding input of one of the rectifiers and with a corresponding input of the other rectifier.

By way of example, the switch system may be configured to connect together the inputs of one of the rectifiers when the switch system is in the second state, the other rectifier then delivering a rectified voltage substantially equal to the peak voltage between the phases of the alternator.

The outputs from the two rectifiers may be connected in parallel.

In another exemplary embodiment of the invention, the switch system is arranged, while in the second state, to short-circuit the output from the second rectifier, at least temporarily.

By way of example, the output from the second rectifier may be connected to the output from the first rectifier by diodes so that the output from the second rectifier can be short-circuited without also short-circuiting the output from the first rectifier.

The switch system may include at least one switch configured to short-circuit the output from the second rectifier or input(s) of the second rectifier.

The switch may be electromechanical or electronic. When electronic, the switch may be unidirectional or bidirectional depending on the requirements of the configuration of the circuit.

In an exemplary embodiment of the invention, the switch is caused to close in intermittent manner in order to regulate voltage. The voltage can be regulated to a value that lies, for example, between the peak voltage between the phases and the peak voltage per phase, the amplitude of the range over which the voltage varies being for example less than 15 V when the speed of rotation of the alternator varies between 1000 tr/min and 1700 tr/min.

By way of example, the voltage may be regulated by acting on the switching frequency of the switch and/or on its duty ratio when using variable-pulse width modulation.

The alternator may present an arbitrary number of phases, greater than or equal to 2, for example it may be a two-phase, three-phase, or four-phase alternator.

By way of example, the electricity production circuit may be mounted on board a vehicle.

Exemplary embodiments of the invention also provide an assembly comprising:

an engine;

an electricity production circuit as defined above; and one or several electrical motors, for example a refrigeration system or an air-conditioning system for a vehicle, powered by the electricity production circuit.

By way of example, the engine is an engine used for propelling a vehicle, for example a diesel engine.

The engine may also be an engine of an electricity generator unit for driving an alternator at variable speed.

The electricity production circuit may include an inverter for converting the rectified voltage into an alternating voltage at constant frequency.

The rectified voltage input to the inverter may be delivered by one or both of the rectifiers.

In an exemplary embodiment of the invention, the output from the second rectifier is optionally short-circuited, without there being any voltage regulation by switching the switch for short-circuiting the output from the second rectifier at a relatively high frequency, the rectified voltage then taking on only two values corresponding respectively to per-phase rectification and to rectification between phases.

In another exemplary embodiment of the invention, the switch is switched at a relatively high frequency so as to regulate the rectified voltage. Frequency and/or duty ratio can be varied.

In another exemplary embodiment of the invention, the input(s) to the second rectifier may be short-circuited or not short-circuited without there being any voltage regulation by switching the switch(es) for short-circuiting the input(s) of the second rectifier at a relatively high frequency, the rectified voltage then taking on only two values corresponding respectively to per-phase rectification and to rectification between phases.

In another exemplary embodiment of the invention, the switch(es) may be switched at a relatively high frequency so as to regulate the rectified voltage. The frequency and/or the duty ratio can be varied. The switch(es) may be bidirectional.

The invention also provides in some exemplary embodiments a method for powering a motor, for example belonging to a refrigeration system or an air conditioning system of a vehicle, by an electricity production circuit as previously defined, in which method the rectified voltage powers the motor without an intermediate battery.

The invention also provides in some exemplary embodiments an electricity production circuit comprising:

a first rectifier having inputs and an output for connection to an alternator;

a second rectifier having inputs and an output for connection to the alternator, the outputs of the first and second rectifiers being connected in parallel, the phases of the alternator being for connection in series with the inputs of the first and second rectifiers;

several switches connecting a neutral point and the inputs of the second rectifier;

a control unit configured to control the switching of the switches so as to regulate the rectified voltage, the control unit being configured to control the switches in cyclical way with a predefined delay.

The invention also provides in some exemplary embodiments a method for regulating the voltage delivered to an electrical motor by a rectifier system comprising electronic switches and two rectifiers, in which method triggering angles of electronic switches are determined as a function of a reference voltage value predefined or adjustable by a user, the switches being controlled according to these triggering angles so as to short-circuit two inputs of a rectifier in cyclical way The invention also provides in some exemplary embodiments a method for regulating the voltage delivered to an electrical motor by a rectifier system comprising two rectifiers and/or at least one electronic switch, as a function of a reference voltage value, in which method a switching system is arranged to short-circuit all inputs or the output of one of the rectifiers so as to obtain a rectified voltage corresponding to the reference voltage value.

BRIEF DESCRIPTION OF THE DRAWINGS

The invention can be better understood on reading the following detailed description of non-limiting embodiments thereof, and on examining the accompanying drawings, in which.

MORE DETAILED DESCRIPTION

Figure 1:
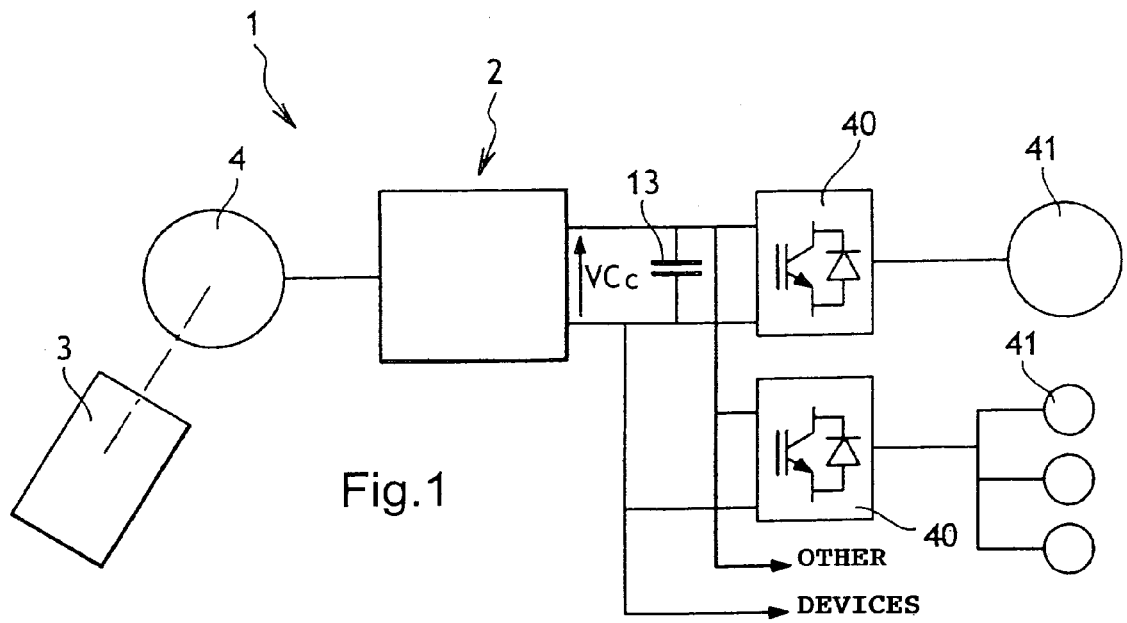
FIG. 1 is a diagram of an assembly, optionally on board a vehicle, fitted with an electricity production circuit made in accordance with the invention.

FIG. 1 shows an assembly 1 comprising firstly an electricity production circuit 2 including an alternator 4, and secondly an engine 3 for driving the alternator.

By way of example, the assembly 1 is on board a vehicle and the engine 3 serves to propel the vehicle.

The engine 3 need not be on board a vehicle.

Whether or not the engine 3 is on board a vehicle, it can drive the alternator at varying speeds.

For example, when the load on the alternator is low, the speed of rotation of the engine 3 can be relatively low and when the load on the alternator increases, the speed of the engine 3 can be increased.

The electricity production circuit 2 delivers a rectified voltage VCc that is filtered by means of a capacitor 13.

Depending on the application, the assembly 1 may include one or more inverters 40 for transforming the rectified voltage into an alternating voltage, e.g. at constant frequency, for powering one or more electric motors 41, e.g. compressors of a refrigeration system of a truck or of an air-conditioning system of a bus.

The rectified voltage VCc may also be delivered directly to other devices, as shown in FIG. 1, these devices being for example different from batteries.

Figure 2:
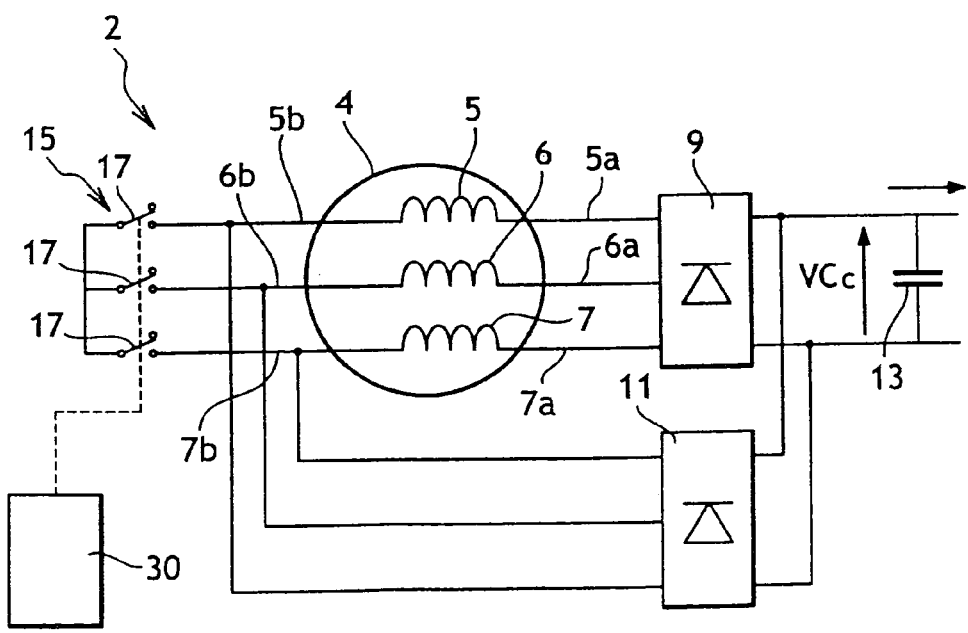
FIG. 2 shows an embodiment of the electricity production circuit.

FIG. 2 shows an embodiment of the electricity production circuit 2 of the invention.

The circuit 2 comprises a three-phase alternator 4 having three phases 5, 6, and 7. The alternator 4 could have permanent magnets or it could have a rotor with windings.

In the example described, the circuit 2 includes a rectifier system comprising a first rectifier 9 and a second rectifier 11 whose output is connected in parallel with that of the first rectifier 9.

Figure 3:
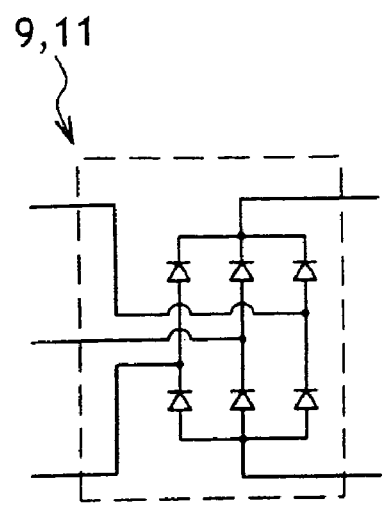
FIG. 3 shows an example of a rectifier in detail.

By way of example, each rectifier 9 or 11 is a full-wave rectifier, having the structure shown in FIG. 3. In variant, each rectifier could be half-wave.

The phases 5, 6, and 7 of the alternator 4 have respective terminals 5a & 5b, 6a & 6b, and 7a & 7b.

The inputs of the first rectifier 9 are connected respectively to the terminals 5a, 6a, and 7a of the phases 5, 6, and 7. The other terminals 5b, 6b, and 7b are connected to the respective inputs of the second rectifier 11.

The circuit 2 also includes a switch system 15 which, in the embodiment of FIG. 2, comprises simultaneously opened or closed switches 17 that serve selectively to connect together or leave disconnected the terminals 5b, 6b, and 7b in order to create a neutral point.

In the example shown, the switch system 15 is shown in a first state where the terminals 5b, 6b, and 7b are not connected together, the switches 17 being open.

In a second state of the switch system 15 (not shown), the switches 17 are closed and the terminals 5b, 6b, and 7b are connected together.

When the switches 17 are open, as shown in FIG. 1, rectification is performed on each phase and the rectified voltage is of an amplitude that is substantially equal to the peak voltage of each phase of the alternator.

When the switches 17 are closed, the rectified voltage is of an amplitude substantially equal to the peak voltage between the phases of the alternator.

The ratio between these two rectified voltages is $\sqrt{3}$ for a three-phase machine, but it would be substantially equal to $\sqrt{2}$ for a two-phase or four-phase alternator.

The switch system 15 includes a control unit 30 that controls the switches 17 so as to open them or close them.

The control unit 30 may receive, for example, information representative of the voltage VCc or the speed N at which the alternator is being driven.

The control unit 30 may be arranged to change the state of the switches 17 as a function of this information, e.g. for the purpose of reducing the amplitude of the range over which the voltage produced by the circuit 2 varies with the alternator being driven at varying speeds.

For example, the control unit 30 may comprise a microcontroller programmed to compare the information representative of the alternator drive speed with at least one reference value, and to cause the switches 17 to open or close in compliance with a preprogrammed control relationship.

Figure 4:
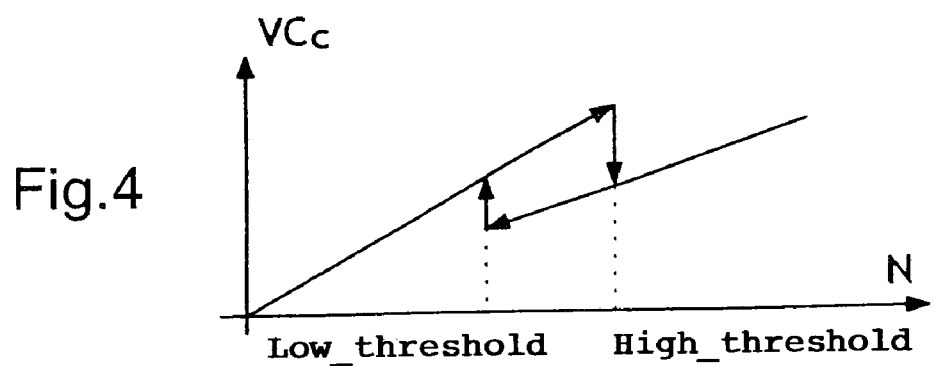
FIGS. 4 and 5 show examples of how the rectified voltage varies as a function of the speed of rotation of the alternator.

By way of example, the control unit 30 may be arranged so that when the speed of rotation N of the alternator increases while remaining below a high threshold, the switches 17 are closed such that the rectifier system rectifies voltages between phases, as shown in FIG. 4.

When the speed of rotation N exceeds the high threshold value, the switches 17 are opened and the rectifier system rectifies a voltage across the terminals of the phases. Opening the switches 17 thus leads to a jump in the rectified voltage.

The control unit 30 may be arranged to create hysteresis and cause the switches 17 to close again when the speed of rotation N decreases and crosses a low threshold that is lower than the high threshold.

In FIG. 2, three switches 17 are shown, however in a variant that is not shown, only two switches 17 are used, one connected to the terminals 5b and 6b and the other to the terminals 6b and 7b.

Figure 5:
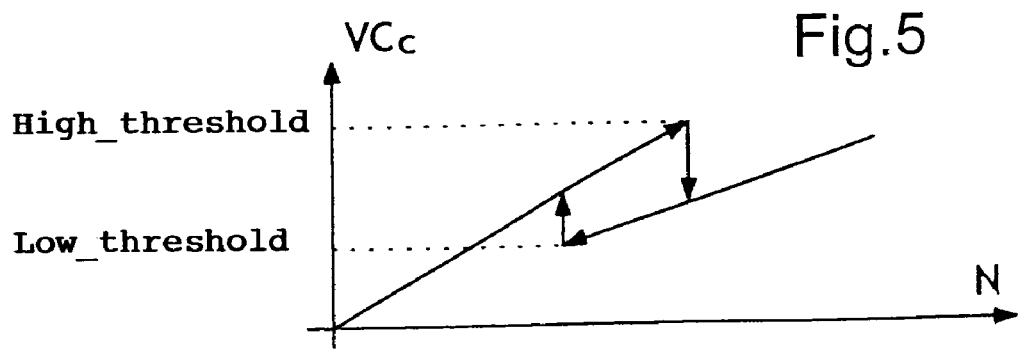

In the variant shown in FIG. 5, the control unit 30 controls the opening and closing of the switches 17 as a function of the rectified voltage VCc.

So long as the voltage VCc remains below a high threshold, the rectifier system rectifies the voltages between phases, and when the voltage VCc crosses the high threshold, the rectifier system rectifies the voltages across the terminals of the phases.

This per-phase rectification is maintained until the rectified voltage VCc drops to below a low threshold, below the high threshold, as shown in FIG. 5, thereby creating hysteresis.

Figure 6:
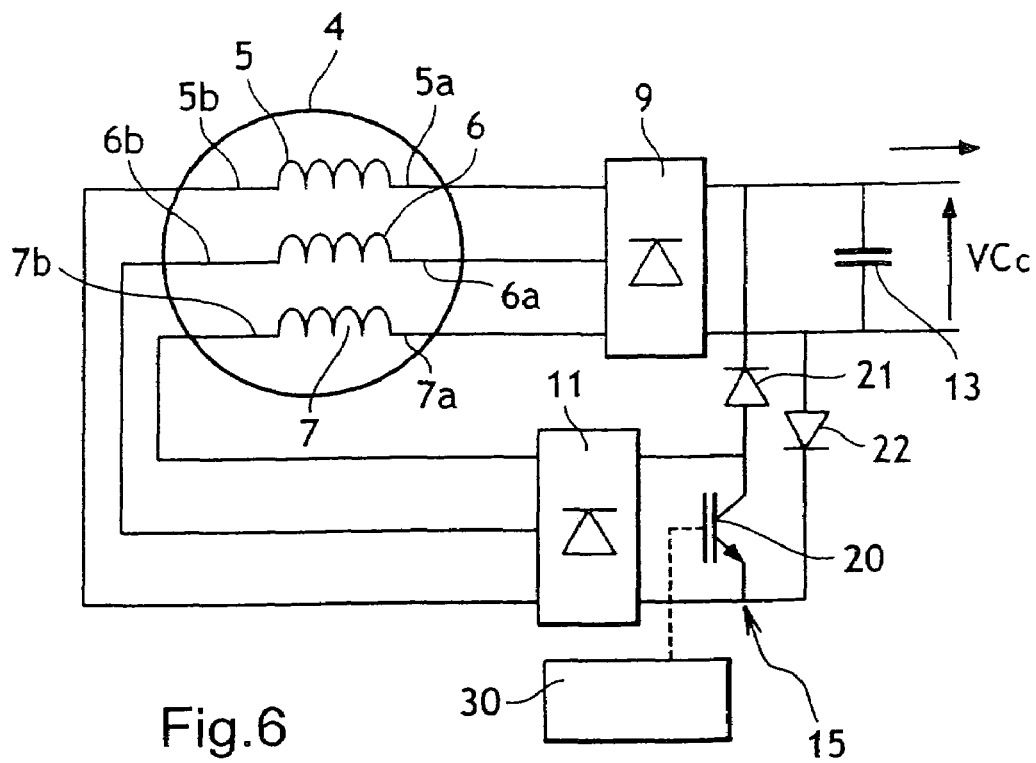
FIG. 6 shows another embodiment of the electricity production circuit.

In the embodiment shown in FIG. 6, the switches 17 are replaced by a switch 20 serving to short-circuit or not short-circuit the output from the second rectifier 11.

The phases 5, 6, and 7 of the alternator are connected in series with the inputs of the rectifiers 9 and 11.

The output from the second rectifier 11 is connected to the output of the first rectifier by two diodes 21 and 22 that enable the switch 20 to short-circuit the output of the second rectifier 11 without short-circuiting the output of the first rectifier 9.

When the switch 20 is open, i.e. when the output of the second rectifier 11 is not short-circuited, rectification takes place on a per-phase basis and the amplitude of the rectified voltage is substantially equal to the peak voltage per phase of the machine.

When the switch 20 is closed, i.e. when the output of the second rectifier 11 is short-circuited, rectification takes place between phases and the peak rectified voltage is of amplitude substantially equal to the peak voltage between the phases of the alternator.

The opening and closing of the switch 20 can be controlled in a manner similar to that described with reference to FIGS. 4 and 5, i.e. with hysteresis.

The switch 20 may also be operated so as to close intermittently at a relatively high frequency, thereby enabling the control unit 30 to regulate the voltage VCc by modulating the chopper frequency or duty ratio.

By way of example, the switch 20 may be switched so as to regulate the voltage VCc on a value that is substantially constant when the frequency of the alternator varies.

By way of example, the switching frequency of the switch 20 may be greater than 1 kilohertz (kHz), for example it may be a few kHz.

Depending on the duty ratio applied to the switch 20, the voltage VCc can be regulated by way of example on any intermediate value lying between the per-phase rectified voltage and the between-phase rectified voltage.

Figure 7:
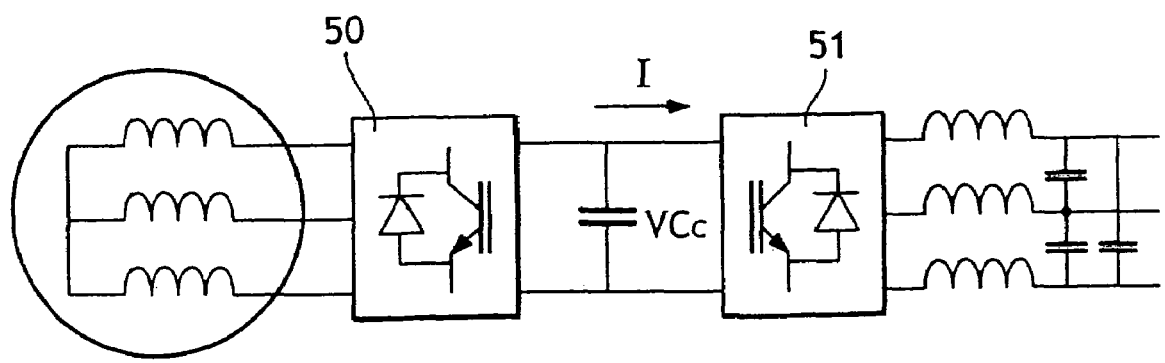
FIG. 7 shows a prior art electricity production circuit.

FIG. 7 shows an electricity production circuit of the prior art including a converter 50 for delivering a regulated rectified voltage and an inverter 51 for converting said rectified voltage into an alternating voltage of constant frequency.

The electricity production circuit described above with reference to FIG. 6 can be useful in replacing the converter 50 and delivering a rectified voltage VCc of amplitude that is substantially constant, by regulating the voltage by means of the switch 20 whenever the frequency of the alternator 4 varies.

Figure 8:
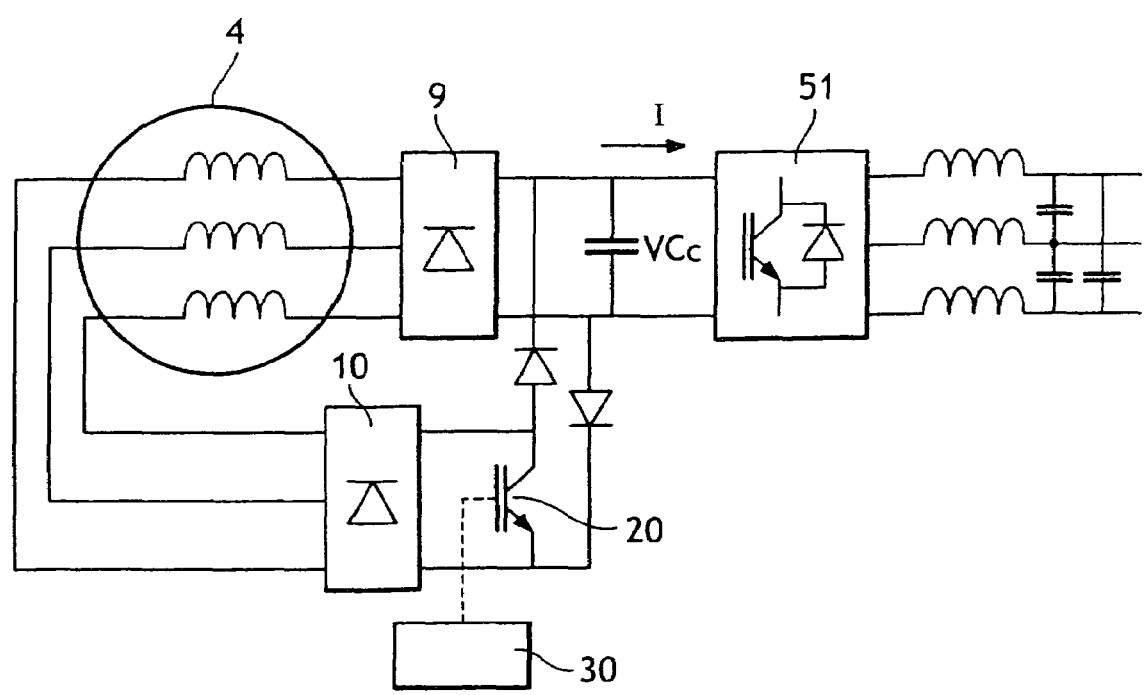
FIG. 8 shows another embodiment of an electricity production circuit.

In another embodiment of the invention, applied to the configuration of FIG. 8, the switch 20 is either open or closed to implement regulation with hysteresis so as to perform rectification between phases or per phase.

In a variant embodiment, the switches 17 of the FIG. 2 embodiment are switched at a frequency that is variable and/or with a duty ratio that is variable as a function of the desired voltage VCc. Under such circumstances, the switches 17 that are used are bidirectional switches capable of switching at the frequency in question. Each switch 17 could be constituted, for example, by two combinations of an IGBT in series with a diode, the combinations being connected opposite ways round.

Figure 9:
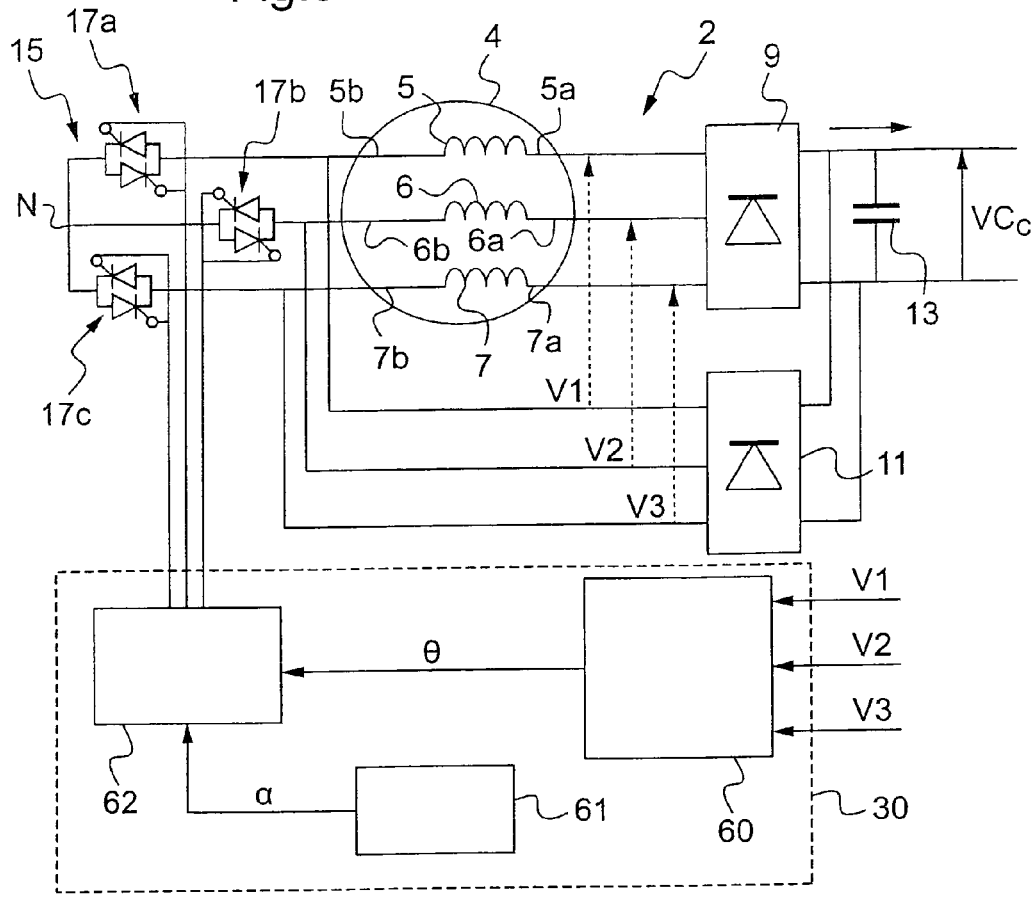
FIG. 9 shows another embodiment of an electricity production circuit.

FIG. 9 shows a variant of the embodiment of FIG. 2. The switch system 15 includes in this embodiment three electronic switches 17a, 17b and 17c that are for example triacs. These switches 17a, 17b and 17c may be controlled independently of one another by a control unit 30 that includes a triggering circuit 62 of the switches, a phase-locked loop circuit 60 and a control circuit 61 for controlling the firing angle of the switches 17a to 17c.

In this embodiment, the switches 17a, 17b and 17c are respectively connected in series between a neutral point N and the terminals 5b to 7b of the alternator.

The inputs of the second rectifier 11 are also electrically connected to the terminals 5b to 7b of the alternator.

Figure 10:
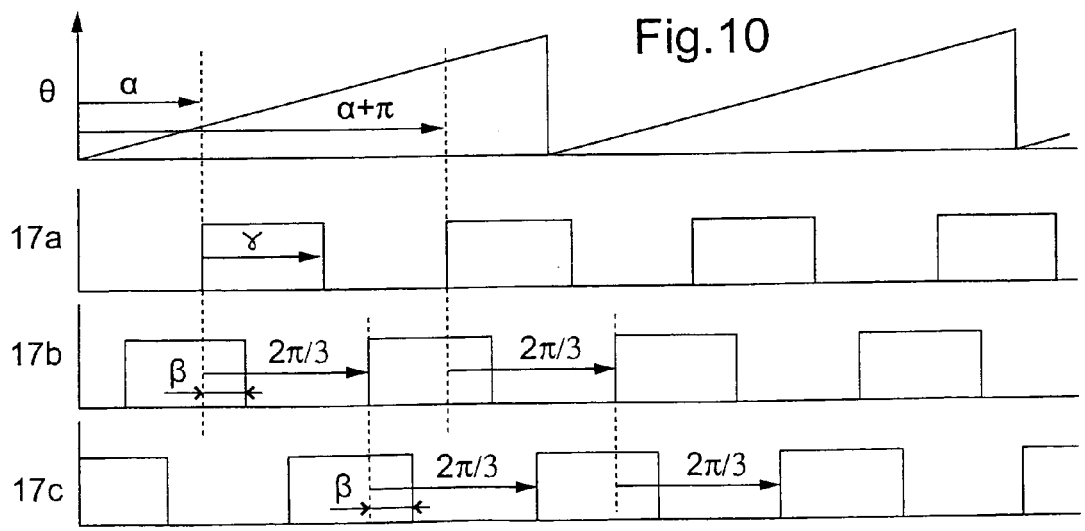
FIG. 10 shows an example of a command sequence of the electronic switches that be performed in the embodiment of FIG. 9.

The closing of switches 17a to 17c is controlled in cyclical way so that the inputs of the second rectifier be short-circuited in cyclical way, in compliance with the sequence shown on FIG. 10 for example.

In this embodiment, the inputs of the circuit 60 comprise voltages V1, V2 and V3 measured across the terminals 5a and 5b as regards phase 5, the terminals 6a and 6b as regards phase 6 and the terminals 7a and 7b as regards phase 7. The inputs of the circuit 60 might also comprise for example voltages between phases.

The circuit 60 is configured to extract from the input voltages a signal representative of the electrical angle $\theta$ of one of the voltages, for example V1. This signal is forwarded to the triggering circuit 62, as shown on FIG. 9.

The control circuit 61 enables to adjust the value of the firing angle $\alpha$ in compliance with the targeted rectified voltage VCc.

The angle $\alpha$ may in this embodiment be understood as the triggering delay angle relative to the 0-value of the angle $\theta$ according to which the switch 17a is caused to close, as shown on FIG. 10.

The switch 17a is further caused to close with a triggering angle of $\alpha+\pi$.

The switch 17b is caused to close with triggering angles equal to $\alpha+2\pi/3$ and to $\alpha+\pi+2\pi/3$ and the switch 17c is caused to close with triggering angles equal to $\alpha+4\pi/3$ and to $\alpha+\pi+4\pi/3$.

The time interval $\gamma$ during which each switch 17a to 17c conducts is sufficient so that two switches conduct simultaneously during an angle $\beta$.

$\gamma$ may be less than $\pi-\alpha$.

While acting on the value of $\alpha$, the mean value of the rectified voltage may vary.

The value of the angle $\alpha$ may be adjusted as a function of a reference value of the voltage VCc for example. The circuit 61 may be arranged to adjust the value of $\alpha$ as a function of the voltage VCc so as to regulate the voltage VCc around a reference value.

The reference value may for example be predefined while manufacturing the control unit 30 or may in a variant be adjusted by a user. The user may, for example, act on an interface such as a keyboard or a selector switch to adjust this reference value.

The unit control 30 may comprise analog and/or digital components.

Where appropriate, a signal representative of the speed of rotation of the alternator may be an input of the control unit 30 so as to carry out regulation as a function of this speed of rotation.

An electricity production circuit of the invention may be used in exemplary embodiments to output a substantially constant rectified voltage VCc when the speed of rotation of the alternator varies over a relatively large range, e.g. with a factor of 1:1.7.

An electricity production circuit of the invention may also be used to deliver a non-regulated voltage varying over a range less than the one without the invention.

In a variant that is not shown, the switches 17a to 17c are not triacs but other electronic components enabling to achieve bidirectional switches capable of being controlled.

The alternator shown is a three-phase alternator but may, in variants, comprise more or less than three-phases.

In the embodiment of FIG. 9, circuits 60 to 62 have been dissociated so that understanding is easier. In a variant, those circuits 60 to 62 are contained in a single circuit, for example when the circuit comprises a microcontroller or a microprocessor capable of performing the various sought functions thanks optionally to additional components.

The term "comprising a" should be understood as being synonymous with "comprising at least one", unless specified to the contrary.

Although the present invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An electricity production circuit comprising:
   a first rectifier comprising inputs and an output;
   a second rectifier comprising inputs and an output, the inputs of the first and second rectifiers being for connection to an alternator so that phases of the alternator are connected in series with the inputs of the first and second rectifiers;
   at least one switch for short-circuiting the output of the second rectifier or at least a part of the inputs of the second rectifier; and
   a control unit for controlling the switching of the at least one switch so as to regulate a rectified voltage delivered by the circuit.

2. A circuit according to claim 1, the at least one switch being configured to short-circuit at least a part of the inputs of the second rectifier.

3. A circuit according to claim 1, the at least one switch being configured to short-circuit the output of the second rectifier.

4. A circuit according to claim 1, including the alternator, the inputs of the first and second rectifiers being connected to the alternator.

5. A circuit according to claim 1, the at least one switch comprising at least one electronic component.

6. A circuit according to claim 5, the at least one switch comprising several electronic switches configured to short-circuit at least two of the inputs of the second rectifier.

7. A circuit according to claim 6, the control unit being configured to control at least one triggering angle of the at least one electronic switch as a function of an electrical angle of one of voltages across terminals of a phase of the alternator.

8. A circuit according to the preceding claim, the control unit comprising a phase-locked loop.

9. A circuit according to claim 1, the alternator comprising several phases, and the circuit comprising a switch system configured to:
   in a first state, enable voltages across terminals of the phases of the alternator to be rectified,
   in a second state, enable voltages between phases to be rectified.

10. A circuit according to claim 9, in which the switch system is configured so as to change state automatically as a function of a drive speed of the alternator.

11. A circuit according to claim 9, in which the switch system is configured so as to change state automatically as a function of the rectified voltage delivered by the circuit.

12. A circuit according to claim 9, in which the switch system is arranged to interconnect the inputs of one of the rectifiers when the switch system is in the second state, other rectifiers delivering a rectified voltage of amplitude substantially equal to a peak amplitude between the phases of the alternator.

13. A circuit according to claim 1, in which the first and second rectifiers include outputs that are connected in parallel.

14. A circuit according to claim 9, in which the switch system is configured to short-circuit the output of the second rectifier when in the second state.

15. A circuit according to claim 14, in which the second rectifier is connected electrically in parallel with the first rectifier only when the switch system is in the first state.

16. A circuit according to claim 14, in which the output from the second rectifier is connected to the output from the first rectifier by diodes, such that the output from the second rectifier can be short-circuited without also short-circuiting the output from the first rectifier.

17. A circuit according to claim 1, in which the control unit is arranged to compare information representative of a drive speed of the alternator with at least one reference value.

18. A circuit according to claim 1, in which the control unit is arranged to compare information representative of the rectified voltage with at least one reference value.

19. A circuit according to claim 1, in which the voltage is regulated by acting on a switching frequency of the switch.

20. A circuit according to claim 1, in which the voltage is regulated by acting on a duty ratio.

21. A circuit according to claim 1, in which the alternator is a three-phase alternator.

22. A circuit according to claim 1, in which the electricity production circuit is arranged for being mounted on board a vehicle.

23. A circuit according to claim 1, including a capacitor connected in parallel with the output of the first rectifier.

24. An assembly comprising:
   an engine;
   an electricity production circuit as defined in claim 1; and
   at least one motor powered by the electricity production circuit.

25. An assembly according to claim 24, in which the engine is an engine configured for propelling a vehicle.

26. An assembly according to claim 24, in which the engine is configured for driving an alternator at a variable speed.

27. A method for powering a motor, by means of an electricity production circuit as defined in claim 1, in which the rectified voltage powers the motor without an intermediate battery.

28. The method of claim 27, the motor being a refrigeration system or an air-conditionning system of a vehicle.

29. A method for regulating a voltage delivered to an electrical motor, the method comprising:
   triggering angles of the several electronic switches of the electricity production circuit according to claim 6 as a function of a reference voltage value, the several electronic switches being controlled according to these triggering angles so as to short-circuit the at least two inputs of the second rectifier in a cyclical way.

30. A method for regulating a voltage delivered to an electrical motor, the method comprising:
   determining a reference voltage value, and short-circuiting at least part of the inputs or the output of the second rectifier of the electricity production circuit according to claim 1 so as to obtain a rectified voltage corresponding to the reference voltage value.

* * * * *